United States Patent
Thomas et al.

(10) Patent No.: US 9,148,065 B2
(45) Date of Patent: Sep. 29, 2015

(54) BIDIRECTIONAL DC-DC CONVERTER

(75) Inventors: Stephan Thomas, Aachen (DE); ir Rik W. A. A. De Doncker, Leuven (BE); Robert Lenke, Aachen (DE)

(73) Assignee: RHEINISCH-WESTFÄLISCH-TECHNISCHE HOCHSCHULE AACHEN, Aachen (DE)

( * ) Notice: Subject to any disclaimer, the term of this patent is extended or adjusted under 35 U.S.C. 154(b) by 74 days.

(21) Appl. No.: 14/002,593

(22) PCT Filed: Feb. 27, 2012

(86) PCT No.: PCT/EP2012/053265
§ 371 (c)(1),
(2), (4) Date: Aug. 30, 2013

(87) PCT Pub. No.: WO2012/116953
PCT Pub. Date: Sep. 7, 2012

(65) Prior Publication Data
US 2014/0003095 A1 Jan. 2, 2014

(30) Foreign Application Priority Data
Mar. 1, 2011 (EP) .................... 11156405

(51) Int. Cl.
*H02M 3/335* (2006.01)
*H02M 3/337* (2006.01)

(52) U.S. Cl.
CPC .......... *H02M 3/33584* (2013.01); *H02M 3/337* (2013.01); *Y02E 10/76* (2013.01)

(58) Field of Classification Search
USPC ........................................ 363/21.04
See application file for complete search history.

(56) References Cited

U.S. PATENT DOCUMENTS

| | | | |
|---|---|---|---|
| 5,285,365 A * | 2/1994 | Yamato et al. | 363/8 |
| 7,372,709 B2 * | 5/2008 | Mazumder et al. | 363/16 |
| 8,462,528 B2 * | 6/2013 | Kajouke et al. | 363/127 |
| 8,467,197 B2 * | 6/2013 | Perisic et al. | 363/17 |
| 8,587,962 B2 * | 11/2013 | Perisic et al. | 363/17 |
| 2002/0126517 A1 * | 9/2002 | Matsukawa et al. | 363/69 |

OTHER PUBLICATIONS

International Search Report for corresponding PCT/EP2012/053265, completed Jul. 31, 2013 by Thomas Hanisch of the EPO.

(Continued)

*Primary Examiner* — Emily P Pham
(74) *Attorney, Agent, or Firm* — Tarolli, Sundheim, Covell & Tummino LLP (57) ABSTRACT

The invention puts forward a bidirectional DC-DC converter for high voltages that is as simple as possible and that entails as few losses as possible. The bidirectional DC-DC converter (1) converter comprises an input stage (2) to convert a DC input voltage into first AC voltage, a transformer (3) to transform the first AC voltage into a second AC voltage, and an output stage (4) to convert the second AC voltage into a DC output voltage, whereby, in order to provide the first and/or second AC voltage, at least one of the input stages (2) and/or output stages (4) comprises a branch of a multi-level converter (5) with a first number of active first semiconductor switches (61).

16 Claims, 8 Drawing Sheets

(56) References Cited

OTHER PUBLICATIONS

Aggeler et al.: "Bi-Directional Isolated DC-DC Converter for Next-Generating Power.Distribution—Comparison of Converters Using Si and SiC Devices", Power Conversion.Conference, Apr. 2, 2007-Apr. 5, 2007, pp. 510-517, CP0026561 13, Internet, DOI:.10.1109/PCCON.2007.373015, ISBN: 1-4244-0844-X, p. 517, paragraph VII; Figures 4 & 17.

Canales, et al.: "A Wide Input Voltage and Load Output Variations Fixed-Frequency ZVS DC/DC LLC Resonant Converter for High-Power Applications", Conference Record of the 2002 IEEE Industry Applications Conference: 37th IAS Annual Meeting, Oct. 13-18, 2002,.Pittsburgh, Pa, Usa; [Conference Record of the IEEE Industry Applications Conference. IAS Annual Meeting], IEEE Service CE, vol. 4, Oct. 13, 2002, pp. 2306-2313, XP010609911,.DOI:10.1109/IAS.2002.1042768, ISBN: 978-0/7803-7420-1, p. 2306; Figure 1.

Ghodke, et al.: "Three-Phase/Level, Zero Voltage and Zero Current, Phase Shift PWM DC-DC Converter for High Power Application", Power Electronics Specialists Conference, 2005 PESC '05. IEEE 36th, IEEE, Piscataway, NJ, USA, Jan. 1, 2005, pp. 368-374, XP031000202, DOI:10.1109/Pesc.2005.1581650, ISBN: 978-0/7803-9033-1, I. Introduction; Figure 1.

Pinheiro, et al.: "The Three-Level ZVS PWM Converter a New Concept in High-Voltage DC-to-DC Conversion", Power Electronics and Motion Control, San Diego, CA, Nov. 9-13, 1992,.[Proceedings of the International Conference on Industrial Electronics, Control, Instrumentation and Automation (IECON)], New York, IEEE, US, vol. Conf. 18, 9 Nov. 1992, pp. 173-.178, XP010060727, DOI:10.1109/Iecon.1992.254637, ISBN: 978-0/7803-0582-3, Abschnitte "1/Introduction" und "2. The Three-Level Zero Voltage-Switching Pulse Width Modulated DC-to-DC Converter"; Figure 1.

Zhang, et al.: "Study of the Multilevel Converters in DC-DC Applications", Power Electronics.Specialists Conference, 2004. PESC 04. 2004 IEEE 35th Annual, Aachen, Germany, Jun. 20-25, 2004, Piscataway, NJ, USA, IEEE, US, Jun. 20, 2004, pp. 1702-1706, XP010739842, ISBN:978-0/7803-8399-9, I. "Introduction" und II B "Isolated Multilevel DC-DC Converter"; Figures 7 & 8.

\* cited by examiner

BIDIRECTIONAL DC-DC CONVERTER

RELATED APPLICATIONS

This application claims priority from PCT/EP2012/053265, filed 27 Feb. 2012, which is incorporated herein in its entirety.

TECHNICAL FIELD OF THE INVENTION

The invention relates to bidirectional DC-DC converters for high voltages.

STATE OF THE ART

A direct-current voltage converter, also known as a DC-DC converter, designates an electric circuit that converts a direct voltage fed in at the input into a direct voltage having a higher, lower or inverted voltage level. The conversion is performed employing a periodically operating electronic switch as well as one or more energy storage components. In the realm of electric energy technology, these converters are also referred to as DC chopper controllers.

The inductor (inductive converter) used to temporarily store energy consists of a coil or of a converter-transformer. In contrast to this, converters with capacitive storage (capacitive converters) are referred to as charge pumps. Charge pumps are employed either when no inductors are present, as is the case in integrated circuits, or else when the power output needed is so low that it is not worth using coils, which are costly in comparison to inexpensive capacitors.

DC-DC converters are used as components in switching-mode power supply units for operating consumers such as, for instance, PC power supply units, notebooks, mobile phones, small motors and HiFi devices. The advantages in comparison to linear power supply units are their better efficiency and lower heat generation. In a linear voltage regulator or in a series resistor, in contrast, the superfluous voltage simply "burns out".

DC-DC converters are also available as completely encapsulated converter modules that are sometimes intended for direct installation on printed circuit boards. The output voltage can be lower than, equal to or greater than the input voltage, depending on the model. The best-known modules are the ones that transform an extra-low small voltage into a galvanically isolated extra-low voltage. The encapsulated DC-DC converters are available, for example, for insulation voltages ranging from 1.5 kV to over 3 kV and serve to supply power to small consumers in direct-voltage networks such as, for example, 24 V in industrial installations or 48 V in telecommunications or in electronic modules such as, for instance, 5 V for digital circuits or ±15 V to supply power to operational amplifiers. DC-DC converters are classified according to various criteria and divided into different topologies (type of structure of a branched network on current paths).

In contrast to unidirectional converters, when it comes to bidirectional DC-DC converters, it is immaterial which terminal is defined as the input and which terminal is defined as the output. A bidirectional direction of energy flow allows power to flow from the defined input the towards the output and vice versa.

U.S. Pat. No. 5,027,264 describes a bidirectional DC-DC converter for high voltages in which the function principle is based on a dual active bridge (DAB) topology. Here, the DC input voltage is converted in an input converter into an AC voltage which is then fed to a transformer. The output of the transformer is connected to an output converter that once again converts the AC voltage into a DC output voltage for a load. Such a bidirectional DAB DC-DC converter utilizes the zero crossing of a half-bridge in order to reduce the switching losses. Moreover, the switching frequency can be increased. These DC-DC converters can be implemented in single-phase or multi-phase configurations, whereby an output voltage is provided that can be kept at least close to the desired load voltage. However, the DAB topology used so far requires a serial connection of power-electronic semiconductor switches since the reverse voltage of the semiconductor switches is not sufficient in the case of high DC-link voltages. As a rule, the semiconductor switches require parallel balancing resistors for static voltage balancing that cause permanent losses at high DC-link voltages. On the other hand, the dynamic voltage balancing during switching procedures has to be ensured, thereby making it necessary to employ either snubber networks, or else intelligent and expensive driver circuits or additional circuitry. The snubber losses increase markedly whenever the soft-switched range in a DAB topology has been left due to excessive variability of the input voltage or due to an excessively large load range. In this process, the losses in the snubbers can exceed the losses of the semiconductors. The term snubber network refers to an electric circuit having snubber elements that, in the case of an abrupt interruption of the current flow, are meant to neutralize, for example, interfering high frequencies or voltage peaks that usually occur when inductive loads are switched. Snubber elements limit the rate of rise in voltage or the rate of rise in current on semiconductors.

SUMMARY OF THE INVENTION

One objective of the present invention is to put forward a bidirectional DC-DC converter for high voltages that is as simple as possible and that entails as few losses as possible.

This objective is achieved by a bidirectional DC-DC converter having an input stage to convert a DC input voltage into first AC voltage, having a transformer to transform the first AC voltage into a second AC voltage, and having an output stage to convert the second AC voltage into a DC output voltage, whereby, in order to provide the first and/or second AC voltage, at least one of the input stages and/or output stages comprises a branch of a multi-level converter with a first number of active first semiconductor switches. This yields a multi-level DAB. Here, the input and output stages are insulated vis-à-vis each other. The input stage in a bidirectional DC-DC converter according to the invention can optionally constitute the output stage in another bidirectional DC-DC converter according to the invention. Suitable active semiconductor switches (power semiconductors) are, for example, gate turn-off thyristors (GTO), transistors or MOSFETs. As an alternative, the person skilled in the art can also employ other suitable active semiconductor switches. Converters are devices that convert voltages of any polarity into other voltages. The conversion is performed by means of power electronics, whereby the electric energy is stored in a so-called DC link. For instance, additional filters can also be installed in this DC link. The output voltage of the multi-level converter consists of a plurality of voltage states (levels). In a two-stage converter (2-level converter), there are two voltage states, in a three-stage converter (3-level converter), there are three voltage states, etc. In this context, term multi-level converter comprises all suitable multi-level converters, in other words, for instance, 2-level converters, 3-level converters, 4-level converters, 5-level converters, etc. The bidirectional DC-DC converter according to the invention avoids the need for an expensive serial connection of power-electronic semiconductor switches such as insulated gate bipolar transistors (IGBTs) or integrated gate-commuted thyristors (IGCTs) with intelligent GATE driver circuits or high-loss RC snubber elements, and it also accounts for a low-loss operation. Bidirectional DC-DC converters according to the present invention can be employed, for example, in power electronics, for instance, for DC networks, in energy storage systems—here particularly in battery energy storage systems—in wind-power installations or for regenerative energy systems as voltage converters, especially as voltage converters having a high voltage transformation ratio. The design of the other side—in other words, the input side when the multi-level converter is arranged in the output side, or the output side when the multi-level converter is arranged in the input side—depends on the envisaged application for the bidirectional DC-DC converter, for example, in order to minimize losses for certain operating points, or if the requirements call for a certain voltage variability.

In one embodiment, the multi-level converter is a 3-level converter or a 5-level converter. The 3-level converter is capable of setting three voltage stages at the output. Here, the power semiconductors are loaded with half of the CD-link voltage at the maximum. For purposes of reducing voltage unbalance, here, in contrast to a half-bridge, two semiconductor switches in series are used in each case. Without additional measures, the voltage sharing of the power semiconductors, however, is asymmetrical. The symmetrical voltage sharing of the power semiconductors can be achieved, for example, by means of capacitors arranged in parallel to the power semiconductors. The 5-level converter is analogously capable of setting five voltage stages at the output. In a preferred embodiment, the multi-level converter is a 3-level NPC converter with two clamping diodes. Here, the term NPC stands for "neutral-point-clamped". The levels of the three voltage stages in the 3-level NPC converter can be set symmetrically by means of the clamping diodes, so that the medium voltage corresponds to the zero-voltage level, without the need for balancing networks and/or driver circuits for this purpose. In alternative embodiments, instead of the clamping diodes, it is possible to employ IGBTs (bipolar transistors with insulated gate electrodes), ANPC converters or else capacitors in so-called FLCs for voltage sharing. In one embodiment, the multi-level converter is a 3-level NPC converter (51, 52) with two IGBTs or capacitors instead of clamping diodes. Aside from being used in three-level converters, all of the above-mentioned embodiments can also be used correspondingly in other multi-level converters with a different number of levels. Besides the simplified topology, the introduction of the additional voltage level (in comparison to the 2-level converter) translates into another degree of freedom for the modulation of the converter. The additional degree of freedom can be used, for instance, to minimize the total losses of the converter for a given load range. In the case of a large transformation ratio between the input voltage and the output voltage, it is advantageous to arrange the 3-level NPC converter on the side having the high voltage. In the case of a transformation to high voltages, this would be the output side, while in the case of a transformation to low voltages, this would be the input side. The term transformation ratio refers here to the ratio of the amplitudes between the first and second AC voltages. Accordingly, the side of the high voltage is either the input side or the output side.

In another embodiment, for rectifying the second AC voltage, the output stage has an H bridge or a half-bridge with a second number of active second semiconductor switches. Here, an H bridge consists of two half-bridges. In contrast to unidirectional DC-DC converters, the bidirectional DC-DC converter needs controllable semiconductor switches on the output side as well. The principle of a DAB DC-DC converter is to use the AC voltages at the transformer to bring about a targeted voltage drop via the leakage inductance of the transformer, and thus to control the power flow. The half-bridge here can serve as a bridge rectifier to convert alternating current into direct current which is then supplied at the output. Such a half-bridge is a familiar, conventional and thus reliable component. An actively switched half-bridge or H bridge permits independent control of the phase displacement angle of the alternating voltages that are present at the transformer and thus the targeted control of the power flow. The H bridge can be especially employed in output stages for low DC-link voltages for which no serial connection of semiconductor switches is necessary. In a preferred embodiment, the H bridge is a 2-level H bridge.

In another embodiment, the number of first and second semiconductor switches is the same. This makes it possible to double the permissible DC-link voltage and the useable input voltage range. In one arrangement of the bidirectional DC-DC converter having a 3-level NPC converter stage with two clamping diodes and a 2-level H bridge, in the case of the same number of semiconductor switches, the voltage ratio can be set to equal 1 by adapting the voltage amplitudes, as a result of which no-loss switching is guaranteed over a greater load range in comparison to conventional DAB DC-DC converters.

Figure 7:
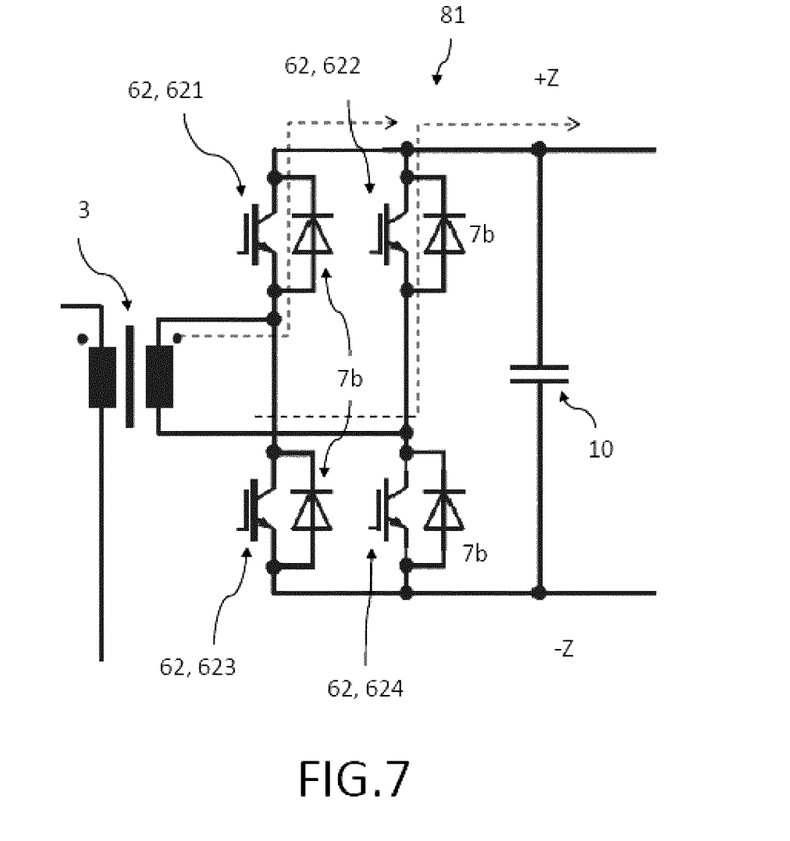
FIG. 7: the output stage as a 3-level half-bridge.

In one embodiment, the number of second semiconductor switches in the half-bridge is four, the second semiconductor switches can be switched independently of each other, and the first and second of the second semiconductor switches are connected to a positive DC-link busbar; in this context, see FIG. 7. As a result, the transformer current at small power levels is minimized. In the case of DC-DC converters, one can also speak of minimization of the reactive power. Here, the term positive DC-link busbar designates the upper potential of the capacitor. If the first and second semiconductor switches are operated in parallel, the transformer is short-circuited and a third voltage level, the zero level, is generated in the half-bridge. If the second semiconductor switch is appropriately actuated, a 2-level half-bridge can also be operated as a 3-level half-bridge. In this manner, the reactive power of the converter can be minimized. Alternatively, this can also be achieved in that the third and fourth of the second semiconductor switches are connected to a negative DC-link busbar. The term negative DC-link busbar accordingly refers to the lower potential of the capacitor. In order to minimize the reactive power, the diagonal second semiconductor switches (the first and fourth or the second and third of the second semiconductor switches) have to be triggered independently.

In another embodiment, for rectifying the second AC voltage, the output stage also has a branch of a second multi-level converter. The term multi-level converter here comprises all suitable multi-level converters, in other words, for instance, 2-level converters, 3-level converters, 4-level converters. 5-level converters, etc. In one embodiment, the second multi-level converter is a 3-level converter or a 5-level converter. Preferably, the second multi-level converter is a 3-level NPC converter with two clamping diodes.

In another embodiment, the DC-input voltage is variable and the voltage amplitude of the input voltage is adapted to the amplitude of the output voltage. The voltage ratio is thus equal to 1, as a result of which no-loss switching can be guaranteed for almost the entire load range. In comparison to the 2-level DAB DC-DC converter, the presented converter has an additional degree of freedom in the modulation for each added voltage level. For example, owing to the additional degree of freedom of the third level in the 3-level version or to the additional degrees of freedom of the fifth level in the 5-level embodiment, etc., the total losses of the converter, including the transformer, etc. can be minimized. The zero-voltage switching and the switching at a minimal current can also be influenced in this manner. The load range for no-loss switching is larger in comparison to conventional DAB DC-DC converters, even for voltage transformation ratios that do not equal 1.

In another embodiment, the topology of the bidirectional DC-DC converter is expanded to three or more phases. This allows the bidirectional DC-DC converter to access a broader range of applications for higher power levels.

The bidirectional DC-DC converter according to the invention can have several multi-level/multi-level ratios. For example, the bidirectional DC-DC converter according to the invention can be a 3-level/2-level DC-DC converter. In other embodiments, the bidirectional DC-DC converter according to the invention can also be a 5-level/2-level DC-DC converter or a 5-level/3-level DC-DC converter or a 3-level/3-level DC-DC converter. Persons skilled in the art can also select other multi-level/multi-level combinations within the scope of the present invention as a function of the envisaged area of application.

BRIEF DESCRIPTION OF THE DRAWINGS

These and other aspects of the present invention are presented in detail in the drawings.

DETAILED DESCRIPTION OF EMBODIMENTS

Figure 1:
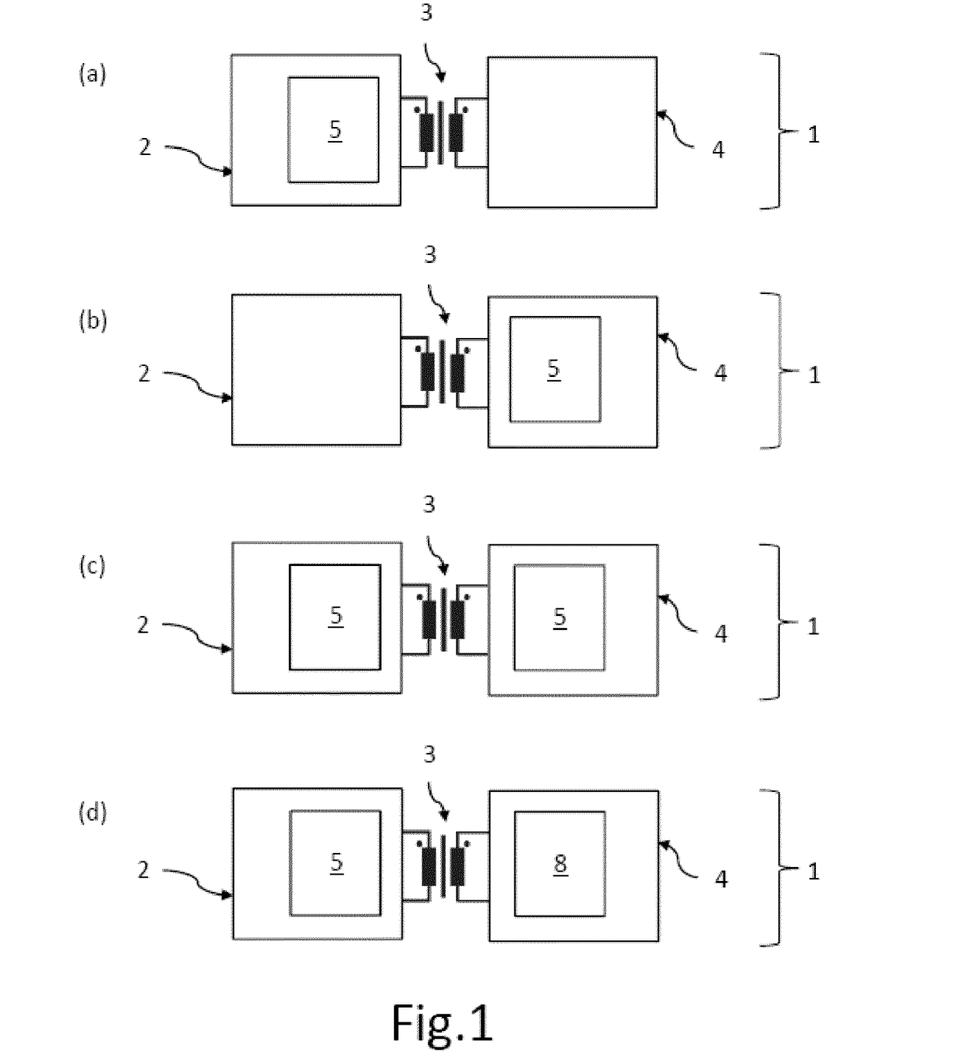
FIG. 1: several embodiments of the bidirectional DC-DC converter having at least one multi-level converter, in the input and/or output stage.

FIG. 1 shows several embodiments (a) to (d) of the bidirectional DC-DC converter 1, each having an input stage 2 to convert a DC input voltage into a first AC voltage, a transformer 3 to transform the first AC voltage into a second AC voltage, and an output stage 4 to convert the second AC voltage into a DC output voltage. The various embodiments (a) to (d) comprise at least one multi-level converter 5 in the input stage 2 and/or in the output stage 4. In embodiment (a), the multi-level converter 5 is situated in the input stage 2. In embodiment (b), the multi-level converter 5 is situated in the output stage 4. In embodiment (c), there is one multi-level converter 5 in the input stage 2 and one multi-level converter 5 in the output stage 4. In embodiment (d), the multi-level converter 5 is situated in the input stage 2, while the output stage 8 comprises a half-bridge or an H bridge.

Figure 2:
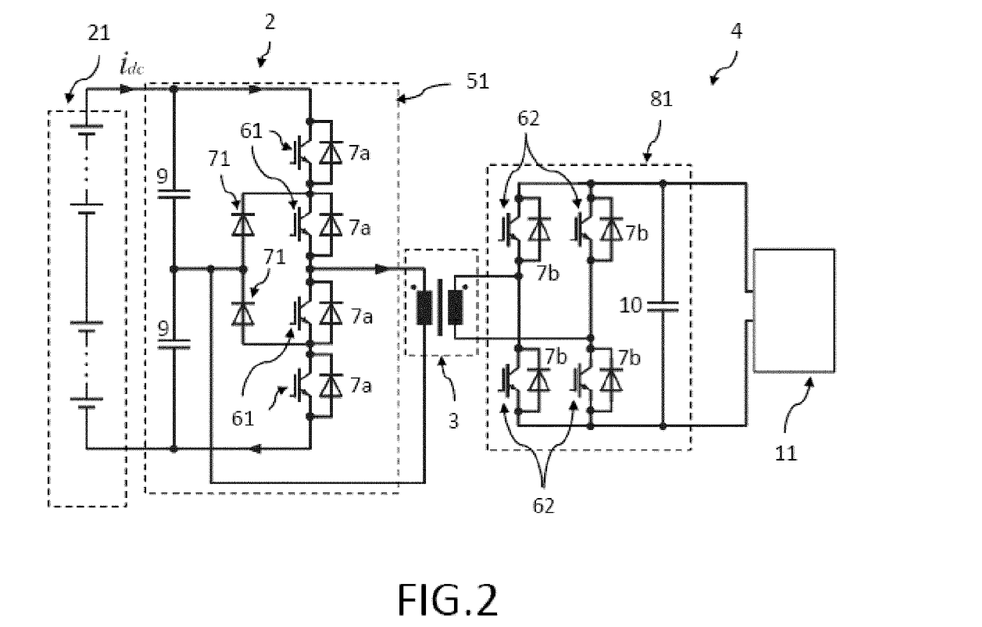
FIG. 2: a bidirectional DC-DC converter according to the present invention, with a 3-level NPC converter in the input stage and with a 2-level half-bridge in the output stage.

FIG. 2 shows a bidirectional DC-DC converter according to the present invention, with a 3-level NPC converter 51 in the input stage and with a 2-level H bridge 81 in the output stage 4. A DC input voltage 21 is present at the input stage 2, the output stage 4 supplies a load 11. Between the input and output stages 2, 4, the output voltage of the input stage 2 is transformed into an input voltage of the input stage 4 by means of a transformer 3. The 3-level NPC converter 51 here comprises two upper and two lower first semiconductor switches 61, each having a diode 7a arranged parallel thereto, two clamping diodes 71 and two capacitors 9. Examples of suitable active first semiconductor switches 61 (power semiconductor switches) here are MOSFETs, IGBTs or IGCTs. The components of the 3-level NPC converter 51 form a CD link in which the electric energy for the conversion process is stored. In other embodiments, additional filters, for example, frequency filters, can also be installed in this CD link. The first AC voltage transmitted by the multi-level converter 5 to the transformer 3 in order to be transformed consists of a plurality of voltage states (levels). As is the case with conventional DAB DC-DC converters, the leakage inductance of the transformer and, if this is not sufficient, an additional inductance in series thereto is employed in order to be able to regulate the power between $-P_{max}$, 0 and $+P_{max}$, wherein $P_{max}$ stands for the maximum power that can be transmitted. In this embodiment, in order to rectify the second AC voltage transformed from the first AC voltage, the output stage 4 comprises a 2-level half-bridge 81 with four active second semiconductor switches 62, each having a diode 7b arranged parallel thereto, so that the number of semiconductor switches 61, 62 in the input and output stages 2, 4 is the same. The capacitor 10 serves to smooth the rectified output voltage.

Figure 3:
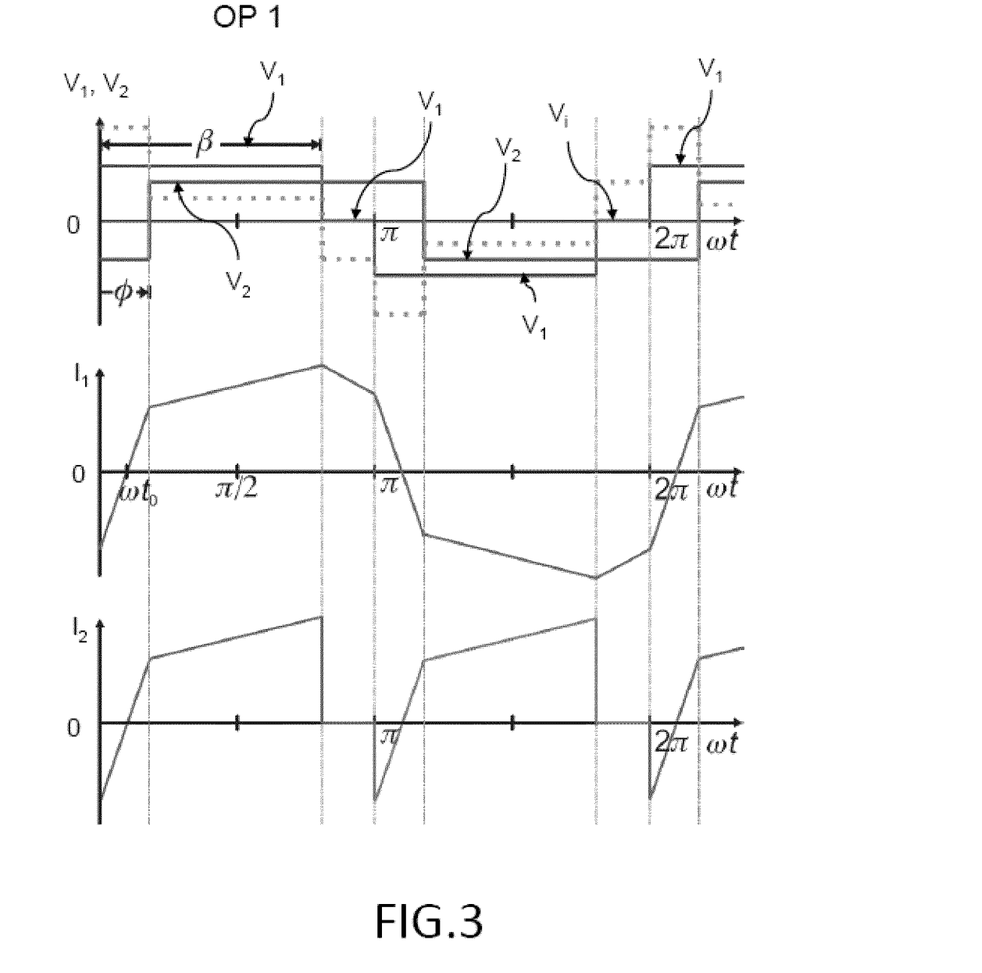
FIG. 3: simulated curves for first and second AC voltages for the appertaining currents at the transformer for a bidirectional DC-DC converter as shown in FIG. 2, for a first mode of operation.

FIG. 3 shows curves as a function of wt for a first AC voltage $V_1$ (input voltage at the transformer) and a second AC voltage $V_2$ (output voltage) at the transformer, as well as for the appertaining currents $I_1$ at the transformer 3 for a bidirectional DC-DC converter 1, and $I_2$ on the DC link as shown in FIG. 2 in the case of a first mode of operation OP1 in which the input voltage $V_1$ is greater than the output voltage $V_2$, whereby, for the phase displacement angle $\Phi$ between the first and second AC voltages $V_1$ and $V_2$, the following applies: $0<\Phi\leq\beta/2$. In the depiction of $V_1$ and $V_2$ over $\omega t$, the three voltage levels $+V_1$, 0, $-V_1$ that are supplied by the 3-level NPC converter as well as the two voltage levels $+V_2$, $-V_2$ that are rectified after transformation via the 2-level half-bridge can be seen at $V_1$. The maximum energy transmission is achieved at a phase displacement angle $\Phi=\beta/2$, whereas at $\Phi=0$, the energy transmission for the mode of operation 1 is minimal. For $\Phi>\beta/2$, the energy transmission is likewise less once again, although the reactive power rises.

Figure 4:
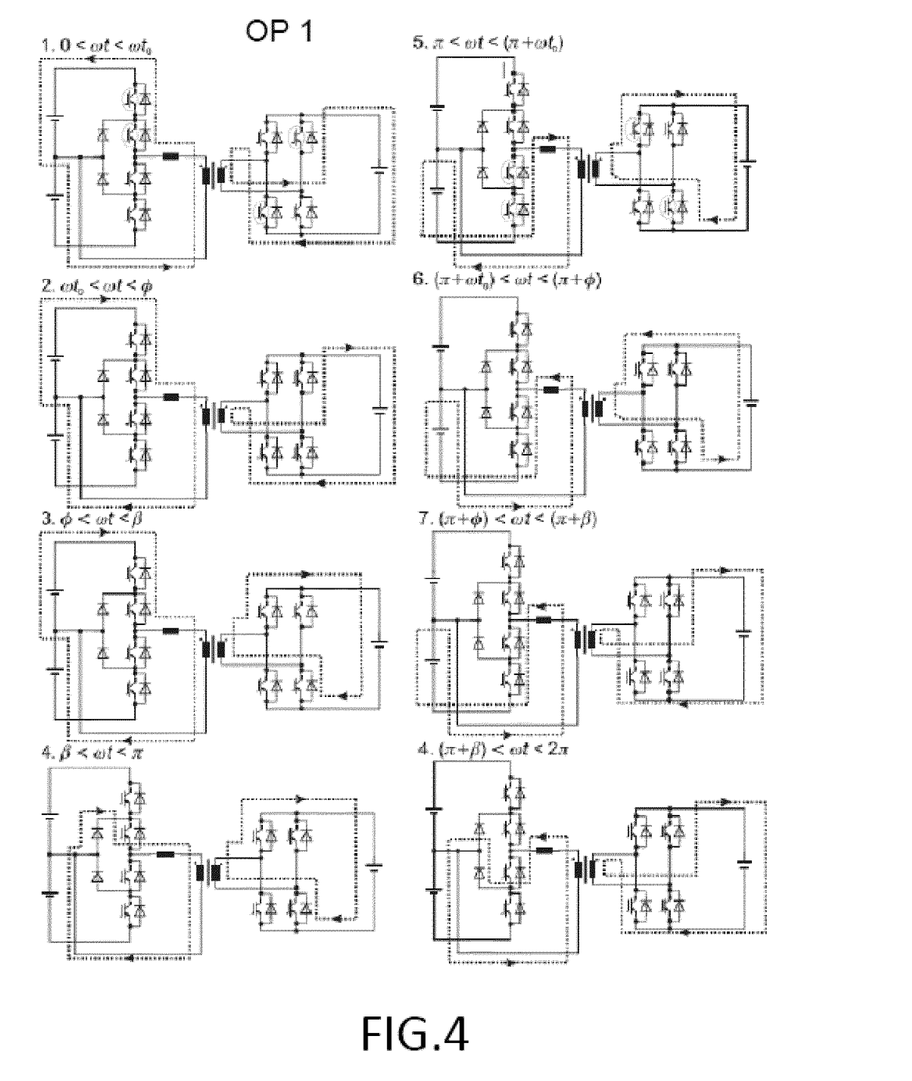
FIG. 4: current curves of the input and output stages of a bidirectional DC-DC converter according to the invention as shown in FIG. 2, for the first mode of operation.

FIG. 4 shows the current curves (broken-line circles with an arrow indicating the direction of current flow) that correspond to FIG. 3 (first mode of operation OP1) in the topology of the DC link of the input and output stages of a bidirectional DC-DC converter according to the invention as shown in FIG. 2, wherein $V_1 \geq V_2$ and $0<\Phi\leq\beta/2$ for the total range $0<\omega t<2\pi$. FIG. 4 comprises eight depictions showing the various current curves for the eight intervals in the ranges $0<\omega t<2\pi$: (1) $0<\omega t<\omega t_0$, (2) $\omega t_0<\omega t<\Phi$, (3) $\Phi<\omega t<\beta$, (4) $\beta<\omega t<\pi$, (5) $\pi<\omega t<(\pi+\omega t_0)$, (6) $(\pi+\omega t_0)<\omega t<(\pi+\Phi)$, (7) $(\pi+\Phi)<\omega t<(\pi+\beta)$, and (8) $(\pi+\beta)<\omega t<2\pi$. The circles around the first and second semiconductor switches in the depictions (1) and (4) designate the switches that can be switched voltage-less since a current flow is still present in the anti-parallel diode.

Figure 5:
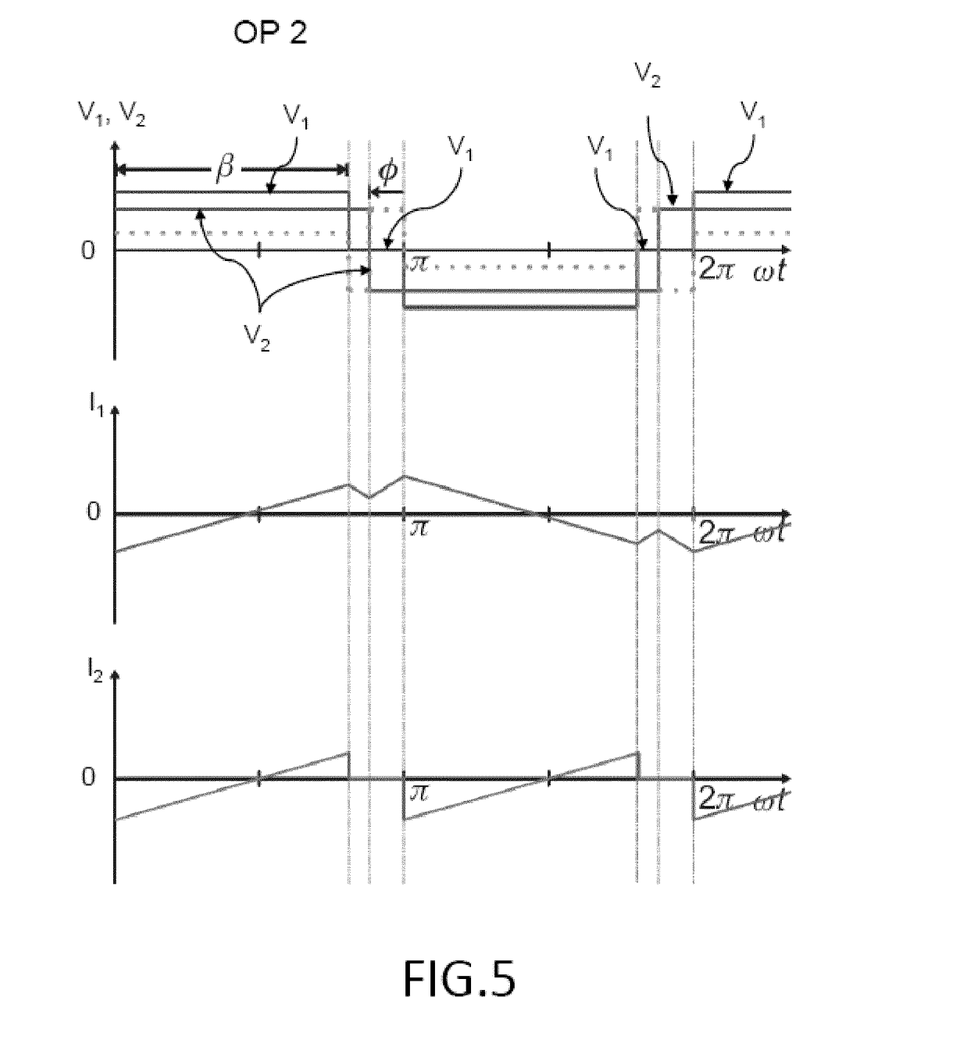
FIG. 5: curves for first and second AC voltages as well as for the appertaining currents at the transformer for a bidirectional DC-DC converter as shown in FIG. 2, for a second mode of operation.

For purposes of a bidirectional operation of the DC-DC converter 1 according to the invention, the 3-level/2-level DAB arrangement from FIG. 2 can be operated in a second mode of operation OP2 with a negative phase displacement angle φ<0. For the mode of operation 2 wherein −π+β≤Φ<0, FIG. 5 shows simulated curves for the first AC voltage $V_1$ and the second AC voltages $V_2$ as well as for the appertaining currents $I_1$ at the transformer 3 for a bidirectional DC-DC converter 1 and $I_2$ on the DC link. For reasons of symmetry, the transformed current for a full period is completely characterized by a period of π. In the depiction of $V_1$ and $V_2$ over ωt, the three voltage levels $+V_1$, 0, $-V_1$ that are supplied by the 3-level NPC converter as well as the two voltage levels $+V_2$, $-V_2$ that are rectified after transformation via the 2-level half-bridge can be seen at $V_1$. The energy transmission reaches zero at a phase displacement angle φ=(−π+β)/2. The maximum energy transmission in this mode of operation is achieved at a phase displacement angle Φ=0.

Figure 6:
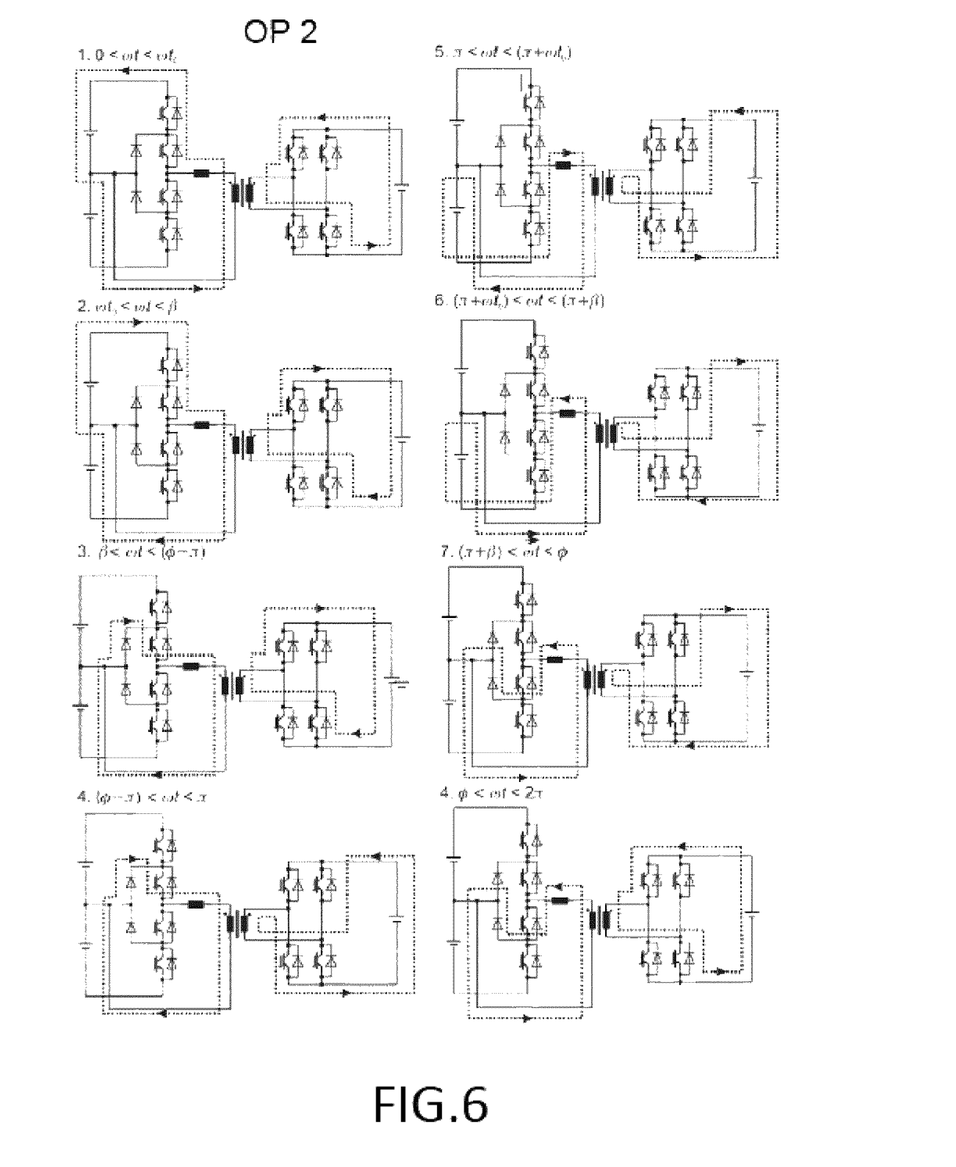
FIG. 6: current curves in the DC links of the input and output stages of a bidirectional DC-DC converter according to FIG. 2, for the second mode of operation.

FIG. 6 shows the current curves (broken-line circles with an arrow indicating the direction of current flow) that correspond to FIG. 5 (second mode of operation OP2) in the topology of the DC links of the input and output stages of a bidirectional DC-DC converter according to the invention as shown in FIG. 2, wherein $V_1$>$V_2$ and π+β≤Φ<0 for the total range 0<ωt<2π. FIG. 4 comprises eight depictions showing the various current curves for the eight intervals in the ranges 0<ωt<2π: (1) 0<ωt<ωt$_0$, (2) ωt$_0$<ωt<β, (3) β<ωt<(Φ−π), (4) (Φ−π)<ωt<π, (5) π<wt<(π+ωt$_0$), (6) (π+ωt$_0$)<ωt<(π+β), (7) (π+β)<ωt<Φ, and (8) Φ<ωt<2. The circles around the first and second semiconductor switches in the depictions (1) and (4) designate the switches that can be switched voltage-less since a current flow is still present in the anti-parallel diode.

FIG. 7 shows the H bridge 81 as the output stage of the bidirectional DC-DC converter according to the invention from FIG. 2 as a magnified section. Here, the second semiconductor switches 62 can be switched independently of each other, and the first 621 and second 622 of the second semiconductor switches 62 are connected to a positive DC-link busbar +Z. As a result, the transformer current at lower power levels is minimized. The DC link here consists of the H bridge and a capacitor 10 parallel to the bridge. The positive DC-link busbar +Z here designates the upper potential of the capacitor 10. If the first 621 and second 622 semiconductor switches are operated in parallel, the transformer 3 is short-circuited (indicated by the broken-line arrows) and a third voltage level, the zero level, is generated in the half-bridge 81. If the second semiconductor switch 62 is appropriately actuated, a 2-level half-bridge 81 can also be operated as a 3-level half-bridge. In this manner, the reactive power of the converter can be minimized. Alternatively, this can also be achieved in that the third 623 and fourth 624 of the second semiconductor switches 62 are connected to a negative DC-link busbar +Z. The term negative DC-link busbar −Z accordingly refers to the lower potential of the capacitor 10. In order to minimize the reactive power, the diagonal second semiconductor switches (the first 621 and fourth 624 or the second 622 and third 623 of the second semiconductor switches 62) have to be triggered independently.

Figure 8:
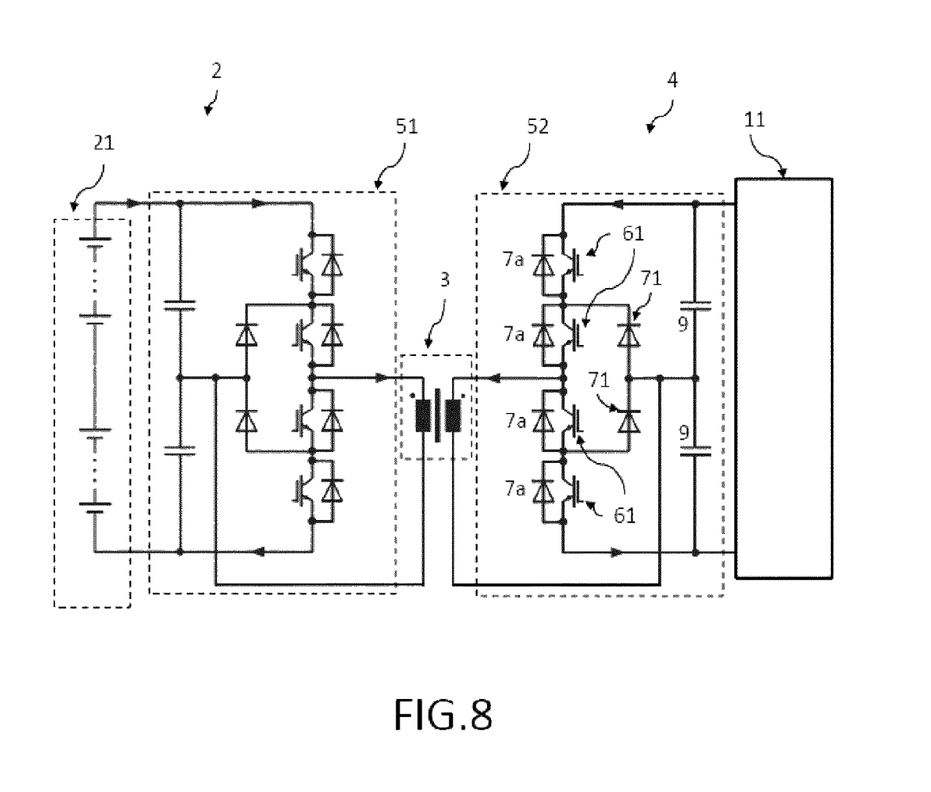
FIG. 8: an alternative bidirectional DC-DC converter according to the present invention, with two 3-level NPC converters as the input and output stages.

FIG. 8 shows an alternative bidirectional DC-DC converter 1 according to the present invention, with two 3-level NPC converters as the input and output stages 2, 4. The input side corresponds to the input side 2 from FIG. 2; therefore, reference is hereby made to the description pertaining to FIG. 2 for the details of the input stage 2. The output stage 4 comprises a second 3-level NPC converter 52 that likewise comprises two upper and two lower first semiconductor switches 61, each having a diode 7a arranged parallel thereto, two clamping diodes 71 and two capacitors 9. Examples of suitable active first semiconductor switches 61 (power semiconductor switches) here are MOSFETs, IGBTs or IGCTs. The components of the second 3-level NPC converter 52 likewise form a CD link in which the electric energy for the conversion process is stored. In other embodiments, additional filters can also be installed in this CD link.

The detailed presentation of the invention in this section and in the figures is given by way of an example of conceivable embodiments within the scope of the invention and consequently should not be construed in a limiting manner. In particular, the quantities given should be adapted by the person skilled in the art to the specific operating conditions of the switch (current, voltage). For this reason, all of the quantities given should only be construed as examples of specific embodiments.

Alternative embodiments that might be considered by the person skilled in the art within the scope of the present invention are likewise encompassed by the scope of protection of the present invention. In the claims, terms like "one" also include the plural. The reference numerals given in the claims should not be construed as a limitation.

LIST OF REFERENCE NUMERALS 1 bidirectional DC-DC converter
2 input stage
21 DC input voltage supply
3 transformer
4 output stage
5 multi-level converter
51 3-level NPC converter in the input stage
52 3-level NPC converter in the output stage
61 first semiconductor switch
62 second semiconductor switch
621 first of the second semiconductor switches
622 second of the second semiconductor switches
623 third of the second semiconductor switches
624 fourth of the second semiconductor switches
7a rectifier diodes of the multi-level converter
7b rectifier diodes of the half-bridge
71 clamping diodes of the multi-level converter, here a 3-level NPC converter
8 H bridge or half-bridge
81 2-level H bridge or 2-level half-bridge
9 DC-link capacitor
10 capacitor for smoothing the output voltage
11 load
OP1 first mode of operation
OP2 second mode of operation
$V_1$, $I_1$ voltage/current of the first AC voltage
$V_2$, $I_2$ voltage/current of the second AC voltage
+Z, −Z positive/negative DC-link busbar of the half-bridge

The invention claimed is:

1. A bidirectional DC-DC converter having an input stage to convert a DC input voltage into first AC voltage, having a transformer to transform the first AC voltage into a second AC voltage, and having an output stage to convert the second AC voltage into a DC output voltage, whereby, in order to provide the first and/or second AC voltage, at least one of the input stages and/or output stages comprises a branch of a multi-level converter with a first number of active first semiconductor switches, wherein the multi-level converter comprises an additional voltage level to provide another degree of freedom for modulation of the bidirectional DC-DC converter to minimize total losses of the converter for a given load range, and wherein the transformer provides a leakage inductance to control a power flow via the AC voltages to achieve a targeted voltage drop in response to the leakage inductance.

2. The bidirectional DC-DC converter according to claim 1, wherein the multi-level converter is a 3-level converter or a 5-level converter.

3. The bidirectional DC-DC converter according to claim 1, wherein the multi-level converter is a 3-level NPC converter with two clamping diodes.

4. The bidirectional DC-DC converter according to claim 1, wherein the multi-level converter is a 3-level NPC converter with two IGBTs or capacitors.

5. The bidirectional DC-DC converter according to claim 3, wherein, in the case of a large transformation ratio, the 3-level NPC converter is arranged on the side of the input or output stage where the higher voltage is present.

6. The bidirectional DC-DC converter according to claim 1, wherein, for rectifying the second AC voltage, the output stage has an H bridge or a half-bridge with a second number of active second semiconductor switches.

7. The bidirectional DC-DC converter according to claim 6, wherein the H bridge is a 2-level H bridge.

8. The bidirectional DC-DC converter according to claim 6, wherein the number of first and second semiconductor switches is the same.

9. The bidirectional DC-DC converter according to claim 6, wherein the number of second semiconductor switches is four, the second semiconductor switches can be switched independently of each other, and the first and second of the second semiconductor switches are connected to a positive DC-link busbar.

10. The bidirectional DC-DC converter according to claim 6, wherein the number of second semiconductor switches is four, the second semiconductor switches can be switched independently of each other, and the third and fourth of the second semiconductor switches are connected to a negative DC-link busbar.

11. The bidirectional DC-DC converter according to claim 1, wherein, for rectifying the second AC voltage, the output stage comprises a branch of a second multi-level converter.

12. The bidirectional DC-DC converter according to claim 11, wherein the second multi-level converter is a 3-level converter or a 5-level converter.

13. The bidirectional DC-DC converter according to claim 12, wherein the second multi-level converter is a 3-level NPC converter with two clamping diodes.

14. The bidirectional DC-DC converter according to claim 1, wherein the DC-input voltage is variable and the voltage amplitude of the input voltage is adapted to the amplitude of the output voltage.

15. The bidirectional DC-DC converter according to claim 1, wherein the topology of the bidirectional DC-DC converter is expanded to three or more phases.

16. A method to operate a bidirectional DC-DC converter having an input stage to convert a DC input voltage into first AC voltage, having a transformer to transform the first AC voltage into a second AC voltage, and having an output stage to convert the second AC voltage into a DC output voltage, whereby, in order to provide the first and/or second AC voltage, at least one of the input stages and/or output stages comprises a branch of a multi-level converter with a first number of active first semiconductor switches, and the transformer provides a leakage inductance, the method comprising the steps of:

Providing an additional voltage level by the multi-level converter to provide additional degree of freedom for modulation of the bidirectional DC-DC converter;

Minimizing total losses of the converter by the additional degree of freedom for a given load range; and Controlling power flow by the AC voltages at the transformer via a targeted voltage drop based on a leakage inductance of the transformer.

* * * * *